United States Patent
Zhang

(10) Patent No.: US 7,529,235 B2
(45) Date of Patent: May 5, 2009

(54) INTERNET BASED TIME DISTRIBUTED MESSAGE NETWORK SYSTEM AND PERSONAL MOBILE ACCESS DEVICE

(76) Inventor: Franklin Zhigang Zhang, 4808 Laurette St., Torrance, CA (US) 90503

( * ) Notice: Subject to any disclaimer, the term of this patent is extended or adjusted under 35 U.S.C. 154(b) by 873 days.

(21) Appl. No.: 10/006,411

(22) Filed: Dec. 3, 2001

(65) Prior Publication Data
US 2002/0067716 A1 Jun. 6, 2002

Related U.S. Application Data

(60) Provisional application No. 60/251,644, filed on Dec. 6, 2000.

(51) Int. Cl.
*H04L 12/66* (2006.01)
*H04L 12/28* (2006.01)
*H04L 12/56* (2006.01)

(52) U.S. Cl. .................... 370/356; 370/392; 370/401

(58) Field of Classification Search .............. 370/338, 370/352, 356, 400, 401, 389, 392
See application file for complete search history.

(56) References Cited

U.S. PATENT DOCUMENTS

| | | | | | |
|---|---|---|---|---|---|
| 6,031,818 | A * | 2/2000 | Lo et al. | ...................... | 370/216 |
| 6,259,925 | B1 * | 7/2001 | Josse | ........................... | 455/466 |
| 6,360,093 | B1 * | 3/2002 | Ross et al. | .............. | 455/414.1 |
| 6,421,714 | B1 * | 7/2002 | Rai et al. | .................... | 709/217 |
| 6,496,704 | B2 * | 12/2002 | Yuan | ........................... | 455/466 |
| 6,603,965 | B1 * | 8/2003 | Dinkin | ....................... | 455/416 |
| 6,697,355 | B1 * | 2/2004 | Lim | ............................ | 370/352 |
| 6,888,803 | B1 * | 5/2005 | Gentry et al. | ............... | 370/259 |
| 6,934,532 | B2 * | 8/2005 | Coppinger et al. | ........ | 455/412.1 |
| 6,992,982 | B1 * | 1/2006 | Meyer et al. | ................. | 370/231 |
| 7,006,479 | B1 * | 2/2006 | Joo et al. | ..................... | 370/338 |
| 7,031,288 | B2 * | 4/2006 | Ogier | ......................... | 370/338 |
| 7,068,624 | B1 * | 6/2006 | Dantu et al. | ................. | 370/331 |
| 7,093,028 | B1 * | 8/2006 | Shao et al. | ................... | 709/240 |
| 2001/0047421 | A1 * | 11/2001 | Sridhar et al. | .............. | 709/230 |
| 2005/0170824 | A1 * | 8/2005 | Dowling | ..................... | 455/418 |

OTHER PUBLICATIONS

Crowcroft, J. "The Internet: a tutorial", IEEE. Jun. 1996. pp. 113-122.*
Robinson et al. "Domain-based acces control for distributed computing systems". pp. 161-170. Sep. 1988.*

* cited by examiner

*Primary Examiner*—Ronald Abelson

(57) ABSTRACT

An Internet based Time Distributed Message Network (TDMN) system and the Personal Mobile Access Device (PMAD) access the system to perform one to one or one to group two-way voice/video and data communications between/among PMADs. The present invention encodes and packs the original voice/video and data information into Time Distributed Message Unit (TDMU). The TDMN system routes the TDMU from the sender PMAD to receiver PMAD. To do this, the TDMN system forms two virtual links (virtual control and security data link, virtual communication data link) to connect the sending and receiving PMADs. When all TDMUs of one operation reach the destination PMAD, the receiving PMAD decodes and reassembles them into the original data format, and runs the corresponding applications. Because the TDMU transmission and reassembly are time distributed, the shortage of the Internet transmission cannot affect the transmission and the reassembly of the TDMU. So the virtual links formed by the TDMN system provides excellent QOS. Also, because of wide connection of the Internet, the TDMN system is a global wide two-way message system.

22 Claims, 8 Drawing Sheets

INTERNET BASED TIME DISTRIBUTED MESSAGE NETWORK SYSTEM AND PERSONAL MOBILE ACCESS DEVICE

CROSS-REFERENCE TO RELATED APPLICATIONS

This application claims the benefit of the Provisional Patent Application Ser. No. 60/251,644 filed Dec. 6, 2000.

BACKGROUND

1. Field of Invention

This invention relates to wireless Internet networking system and devices, specifically to an innovation of Internet based ultra wide area network communication system and devices.

2. Description of Prior Art

It is known in the art of wireless Internet networking, normally people refer it to WAP technology, and/or cellular phone system with Internet browsing and email function. These kinds of wireless Internet are cellular phone technology dependent, in another word; they can only be used wherever cellular phone communication system is available. The function and feature are limited by cellular technology. With these technologies, when one user needs to send email to another user, he needs to send the message from his cellular phone to cell site, and then through cell phone carrier's circuit to a public email server system. The email server delivers the messages to the destination email server and finally reaches the email receiver.

However, in the art of cellular phone communication, the links between user's handsets and cell sites are limited, once one user is connected, others cannot use the same channel until the prior cellular phone gets off the line. And the current cell phone technology does not have enough bandwidth to carry video signal (3G WAP technology will carry some video function). Long distant roaming of the handset is very costly and complicated. This makes remote video communication very difficult.

IP telephony is getting more popular. A lot people try to utilize the IP technology to cut down the cost of long distant calls. However, in order to be compatible with the conventional telephone system, expensive gateway equipments need to be set up, and, it is very hard to maintain the QOS. It is not convenient to use IP telephony, and billing issues are complicated.

Except some dedicated line users, long distant videoconference is almost impossible due to Internet bandwidth limitation. It is even harder for the IP telephony to maintain the QOS when using videoconference.

Currently there are also some low end products such as net meeting and net2phone. Because of varies of the networking topology and bandwidth, the QOS is very unstable and sometimes is too poor to be acceptable. Nonetheless, there are always personal computers needed in the IP telephony and videoconference. The coordination between two users in order to establish IP telephony and videoconference is difficult and very inconvenient. Because personal computers (including notebook computers) cannot be easily moved around with people while connected to the internet, IP telephony and videoconference via PC cannot be as widely used as the cellular phone.

SUMMARY

A wireless Internet networking system comprises an Internet based Time Distributed Message Network (TDMN) system and Personal Mobile Access Device (PMAD). Every Personal Mobile Access Device (PMAD) has a global unique ID number. All information exchange is carried on in between the PMADs, with the Internet based Time Distributed Message Network (TDMN) system guarantees the data exchange between the PMADs. The PMAD sends and receives the Time Distributed Data Message Units (TDMUs). The PMAD packs and unpacks data into TDMU format before transmission and after received. The present invention adopts time-distributed technology based on TCP/IP and Internet. It overcomes the disadvantage of the variation of the Internet bandwidth, and makes a very good use of the Internet, the largest global network. The PMAD can easily roam globally without paying legacy long distance communication fee. Internet based TDMN system comprises of TDMN Domain and a plurality of APs, which are connected to the TDMN Domain via Internet connection.

OBJECTS AND ADVANTAGES

Accordingly, several objects and advantages of my invention are:

1) to utilize the whole Internet as a low cost giant message interchange system;
2) to provide a boundaryless roaming communication;
3) to provide a complete Internet based data, audio, video message communication system.
4) to provide high quality digital wireless internet communication system;
5) to overcome the inconsistent data communication via the internet;
6) to provide very high quality video/voice data communication based on the TDMU protocol;
7) to provide end-to-end communication infrastructure without any message lost;
8) to provide a system with stand-by service feature when the receiver PMAD is not on line;
9) to provide an ultra low cost global roaming communication system based on current internet infrastructure, any of the transmitters or receivers PMADs has same high quality of communication as long as it is connected to Internet;
10) to provide low gain PMAD for less RF pollution to the environment, less RF hazard to the human beings users;
11) to utilize low cost and easy setup wireless access point to provide much coverage for the PMADs.
12) better RF channel and resource usage, compared to cellular phone technology.

The forgoing features and advantages of the present invention can be appreciated more fully from the following description, with references to the accompanying drawings in which.

DESCRIPTION

Preferred Embodiment

Figure 1:
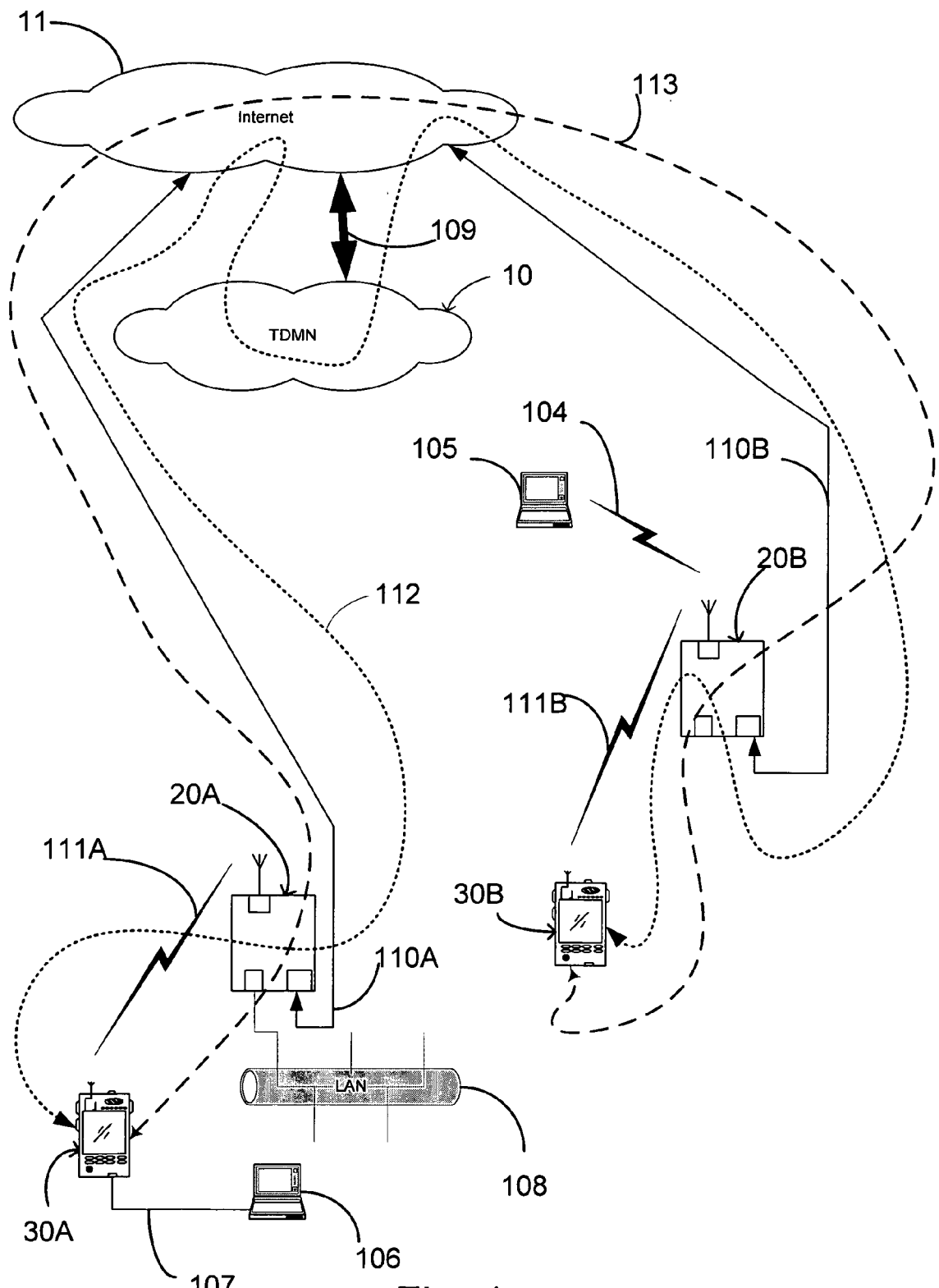
FIG. 1 is a block schematic diagram of a system and method of Internet Based Time Distributed Message Network (TDMN) system and Personal Mobile Access Device (PMAD) of the present invention showing the network architectures of Time Distributed Message Network (TDMN) Domain, local internet link, Access Point, Personal Mobile Access Device (PMAD) and notebook computer.

FIG. 1 is a schematic diagram of the system and method of Internet Based Time Distributed Message Network (TDMN) system and Personal Mobile Access Device (PMAD) of the present invention. As shown, the Time Distributed Message Network (TDMN) system comprises a TDMN Domain 10 and multiple Access Points (APs) 20A, 20B. The TDMN Domain is connected to internet 11 via the internet link 109. The AP 20A, 20B are connected to internet 11 via internet link 110A and 110B, so that they are connected to the TDMN Domain 10 via internet connection 109. The Personal Mobile Access Device (PMAD) 30A, 30B connect to AP 20A, 20B. By control of the TDMN Domain 10, the PMAD 30A can establish two links to the PMAD 30B. There are: security virtual data link 112 and virtual communication data link 113. The TDMN system can accommodate multiple PMADs; each of the PMADs has a unique ID number. In this embodiment, the TDMN system is accommodating three PMADs: 30A, 30B and the notebook computer 105, which is running PMAD simulation software. Each of them has an unique PMAD ID. The PMAD also has a wired connection port, which can be used to connect to other computing device; the PMAD 30A is connecting to the notebook 106 using a wire connection 107. Thus the PMAD 30A and the notebook 106 can work together to share the computing power and resource.

Figure 1A:
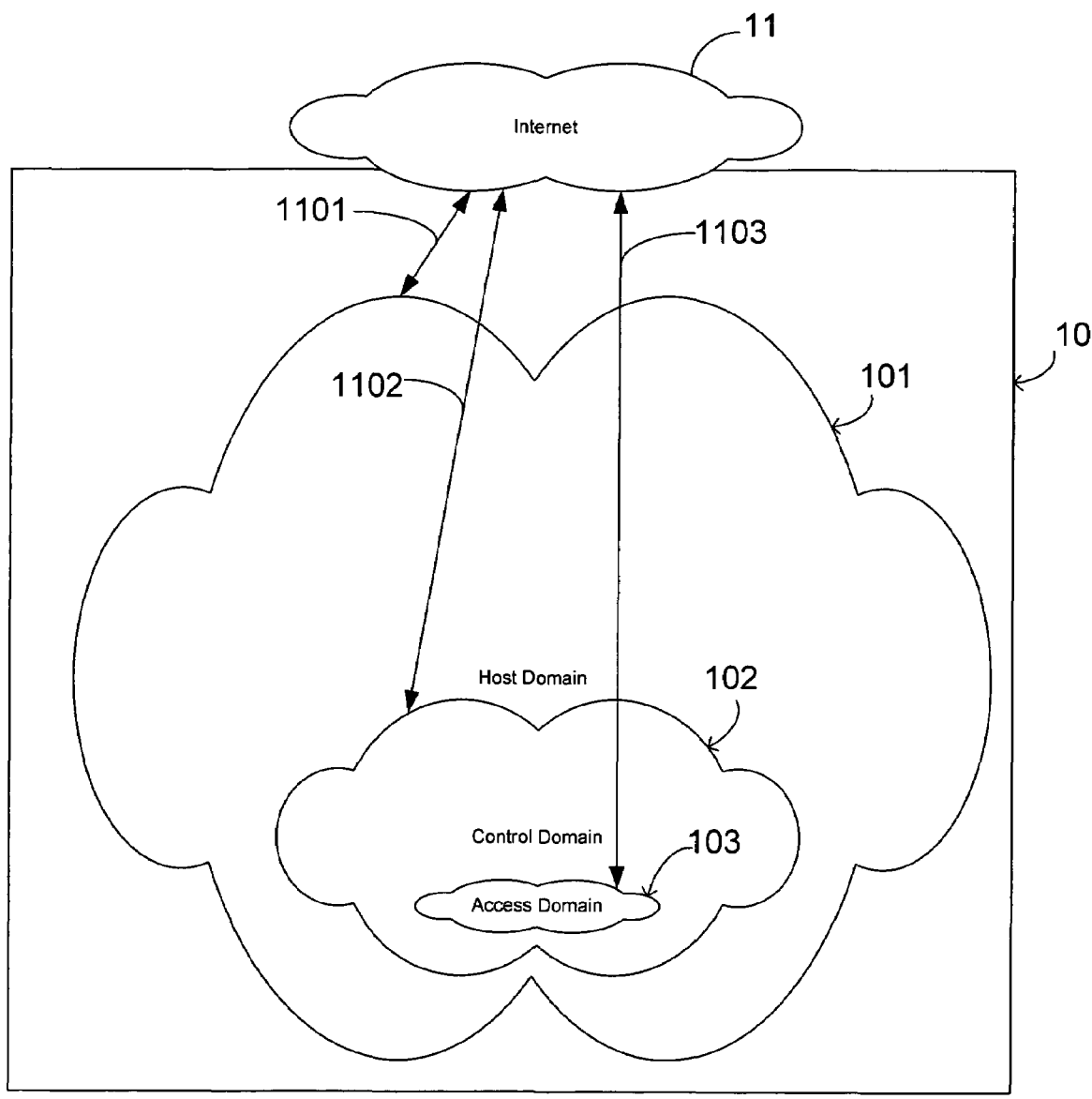
FIG. 1A is a schematic block representation of the hierarchy of the Time Distributed Message Network (TDMN) domain of the present invention.

FIG. 1A shows a schematic block representation of the hierarchy of the Time Distributed Message Network (TDMN) Domain 10 of the present invention. The TDMN Domain 10 is a Host Domain 101 with Internet connection 1101. At the next level of the domain hierarchy is the Control Domain 102, which has an Internet connection 1102. The further next level of the domain hierarchy is the Access Domain 103, which has an Internet connection 1103. A Host Domain 101 may comprise multiple Control Domains 102. A Control Domain 102 may comprise multiple Access Domains 103. As shown, all the Domains have their own Internet connections, thus, all the Domains are connected together via Internet.

Figure 1B:
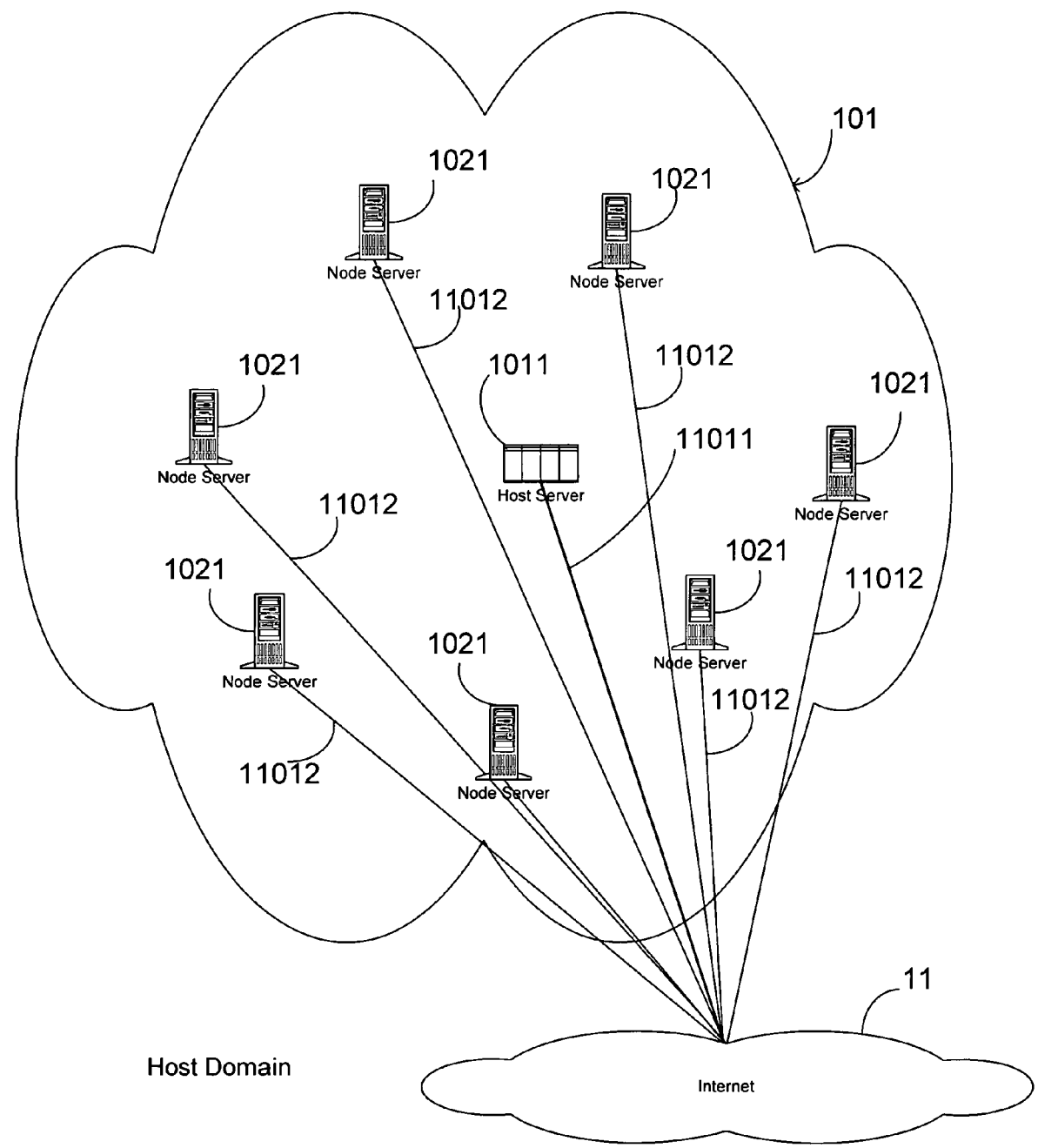
FIG. 1B is a schematic block representation of the Host Domain of the Time Distributed Message Network (TDMN) of the present invention.

FIG. 1B is a schematic block representation of the Host Domain 101 of the Time Distributed Message Network (TDMN) 10 of the present invention. In this embodiment, the host server 1011 is a computer that has a powerful computing power and data storage system. The host server 1011 has an Internet connection 11011. As shown, the Host Domain 10 may comprise multiple Node Servers 1021 which have internet connections 11012. These entire servers are connected together via internet connections. The Host server 1011 will perform as a central server, and manage the activities of the other servers 1021 in the same domain.

Figure 1C:
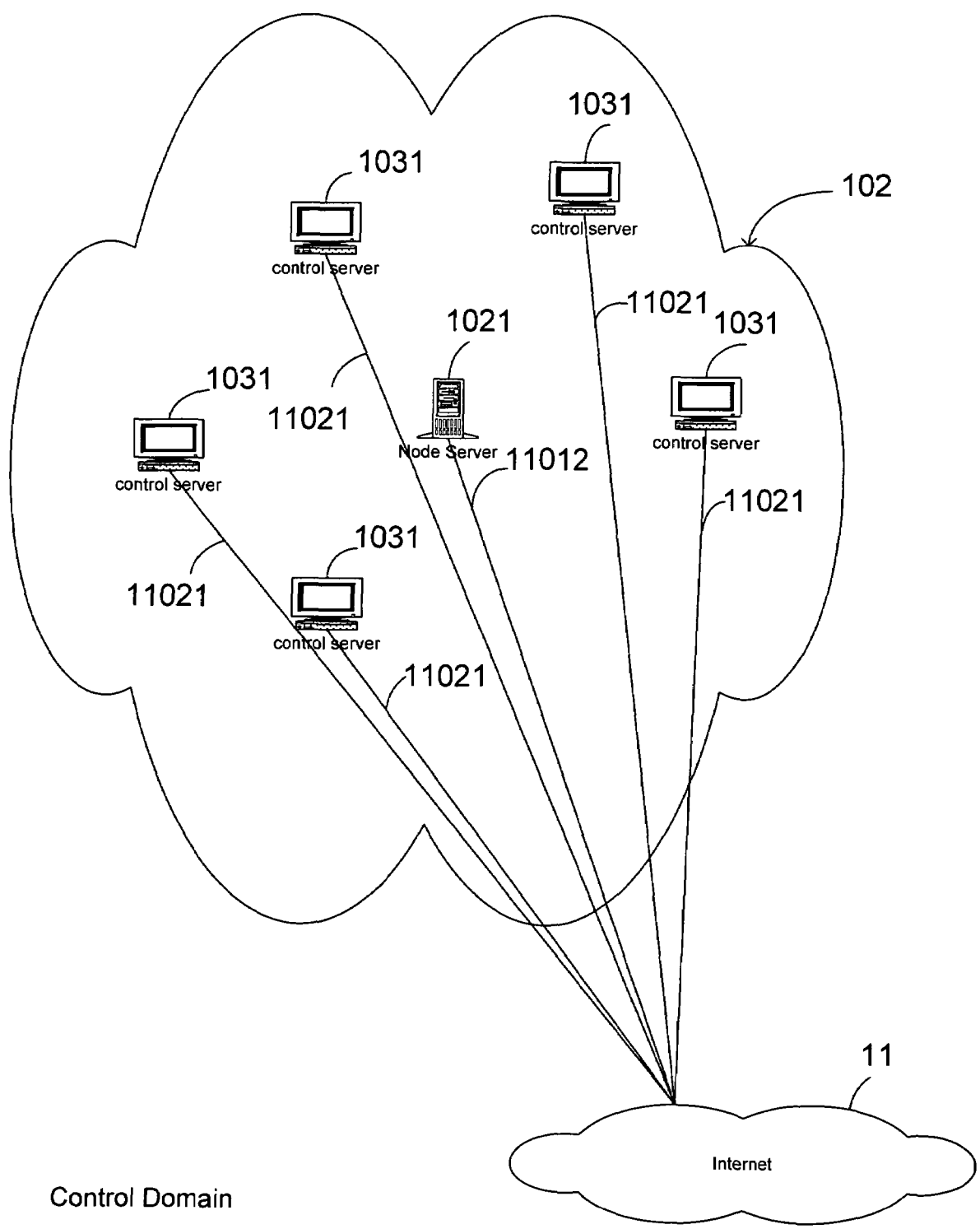
FIG. 1C is a schematic block representation of the Control Domain of the Time Distributed Message Network (TDMN) of the present invention.

FIG. 1C is a schematic block representation of the Control Domain 102 of the Time Distributed Message Network (TDMN) of the present invention. In this embodiment, a Control Domain 102 comprises multiple Control Servers 1031 that have internet connections 11021, and one Node Server 1021 that has a internet connection 11012. The Node Server is the central server that manages the activities of the Control Servers 1031.

Figure 1D:
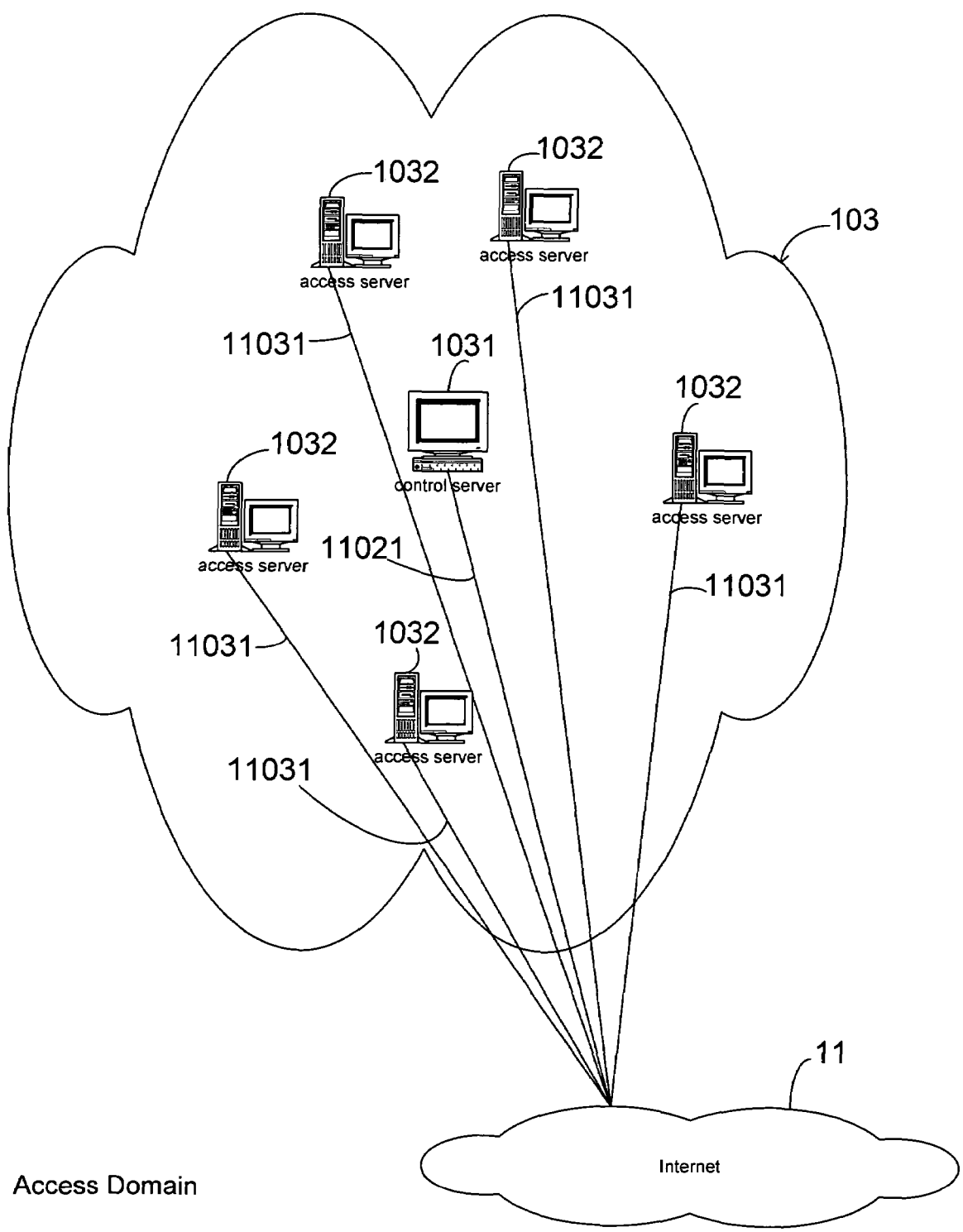
FIG. 1D is a schematic block representation of the Access Domain of the Time Distributed Message Network (TDMN) of the present invention.

FIG. 1D is a schematic block representation of the Access Domain 103 of the Time Distributed Message Network (TDMN) 10 of the present invention. In this embodiment, a Access Domain 103 comprises multiple Access Servers 1032 that have internet connections 11031, and one Control Server 1031 that has a internet connection 11021. The Control Server is the central server that manages the activities of the Access Servers 1032. The Access Servers 1032 are the edge servers of the TDMN Domain 10. The Access Points (AP) 20 is connected to Access Servers 1032 via Internet connection.

Figure 2:
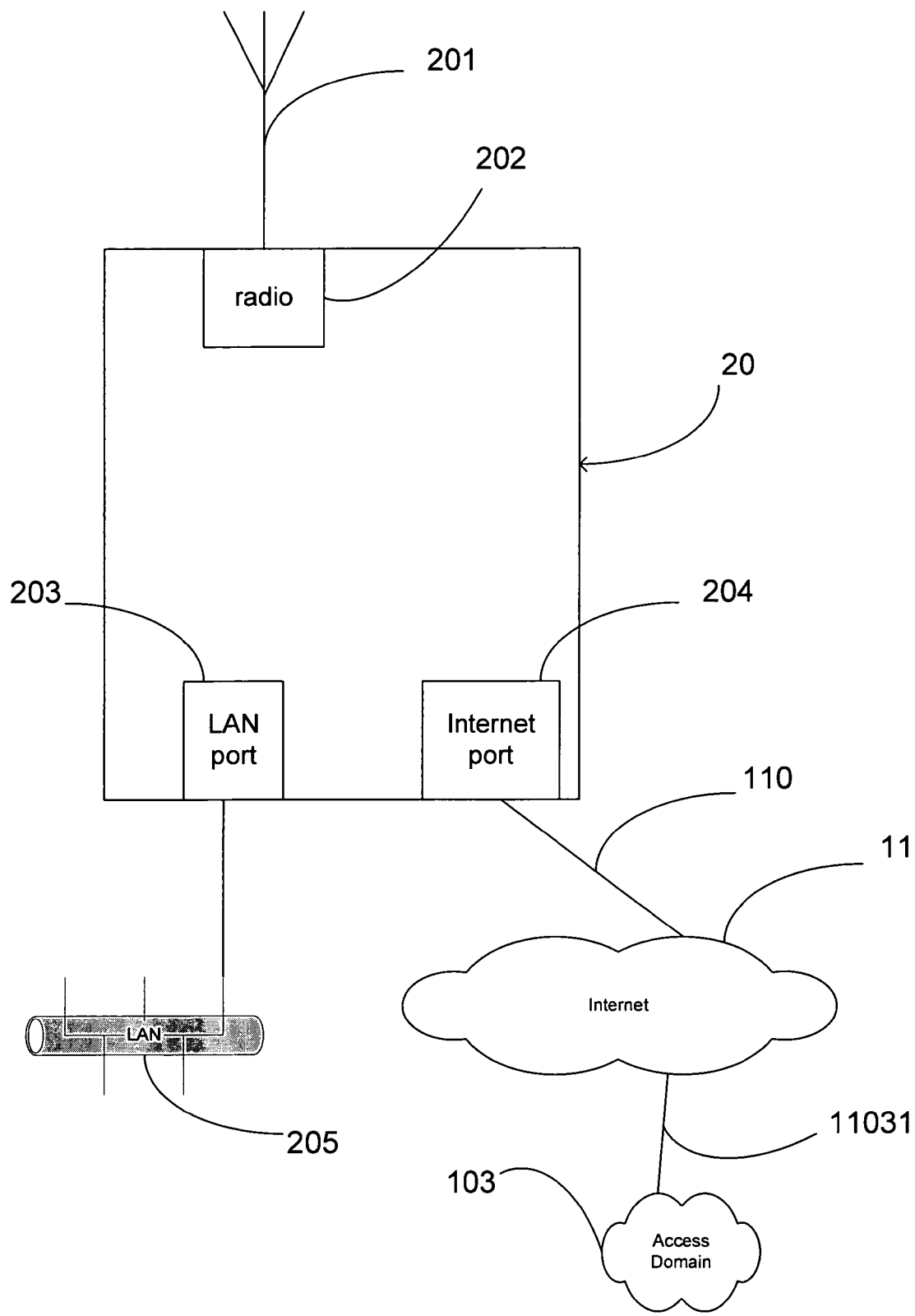
FIG. 2 is a function block diagram illustrates the design of an AP of the present invention and its connections.

FIG. 2 is a function block diagram illustrates the design of an AP 20 of the present invention and its connections. The radio unit 202 is a wireless networking radio and is capable to communicate with the radio of the Personal Mobile Access Device (PMAD) 30. The antenna 201 of the AP 20 can be different from the antenna of PMAD 30. But they are both low gain antennas, and will not cause big electromagnetic wave pollution. So, the cell size 40A (see in FIG. 4) of the AP is a lot smaller than that of the regular cellular phone system. The internet connection port 204 of AP 20 can connect AP 20 to internet 11 via internet connection 110, which can be cable modem, ADSL modem, or other type of internet connection. In order for the PMAD 30 to associate to it and communicate with other PMADs, an AP 20 needs to be connected to an Access Domain 103, which is connected to internet via the connection 11031. AP 20 also has a LAN port 203, which can be connected to a LAN 205, allowing the AP and the devices on the LAN sharing the internet connection 110.

Figure 3:
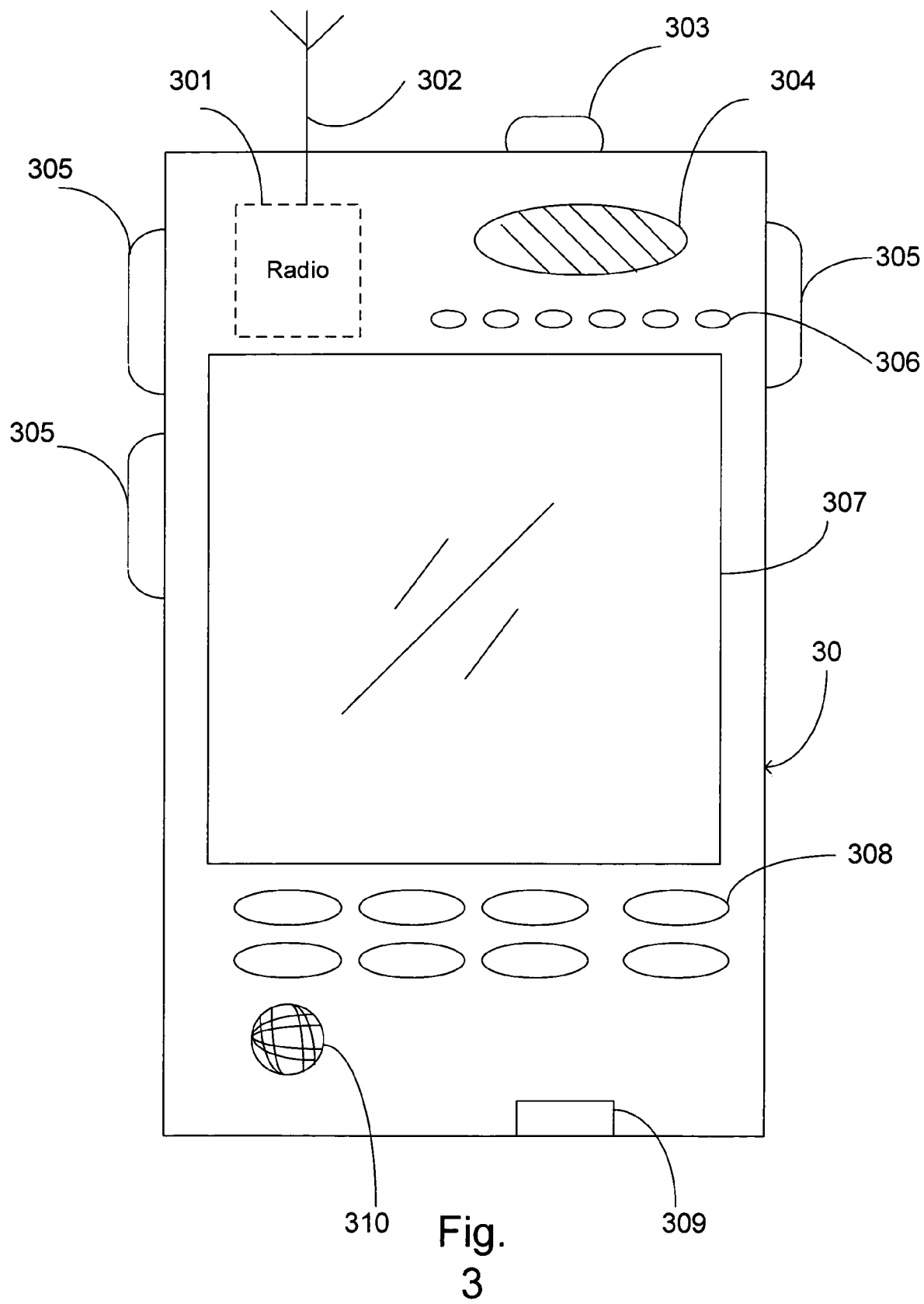
FIG. 3 is a function block diagram shows the design of the Personal Mobile Access Device (PMAD) of the present invention.

FIG. 3 is a function block diagram shows the design of the Personal Mobile Access Device (PMAD) of the present invention. The PMAD 30 has a wireless networking radio unit 301 and antenna 302, which is capable to communicate with the radio unit of Access Point (AP) 20. The CCD unit 303 is the video input device for the PMAD 30. The PMAD 30 also has a pair of voice devices, which are speaker 304 and microphone 310. LCD touch screen 307 can be used to display any video and data information, and data input device. The PMAD 30 also has a wired port 309 which can be connected to a person computer and/or other device to share the wireless connection to AP 20. The control buttons 305 is used to control the message collect/replay and transmit/receive. For example, when PMAD 30 is working at voice mode, the control button 305 can control the record and replay of the voice message. It can be used to control the CCD unit 303 to take a picture and send the picture to the remote receiver. (Another PMAD ). The LED display section 306 can prompt the communication status of the PMAD 30, such as, it blinks when there is incoming message, the wireless link status with AP, and, any on going operation. The feature function control buttons section 308 works like the computer hot key to trigger the different operation of PMAD 30.

Preferred Embodiment

Operation

A PMAD (30) joins in the TDMN when it is physically within the communication range of the Access Point (20). Upon verifying the ID and usage configuration of the PMAD (30) with the TDMN server, AP (20) grants the join of network to the PMAD (30). The AP (20) announces the presence of the PMAD (30) to the TDMN (10). When any PMAD (30) presents to the TDMN (10), the TDMN (10) allows the PMAD (30) to send and receive TDMU. The TDMN (10) can store the TDMUs for a particular PMAD (30) when this destination PMAD is not present to the TDMN (10), and, distribute the stored TDMUs to that PMAD (30) when it is presence to the TDMN (10) next time.

The TDMN technology of this invention encodes and packs the voice and video message (or other data) into multiple Time Distributed Message Units (TDMUs) at the sending PMAD. The TDMN system guarantees these TDMUs reach the destination PMAD completely. The receiving PMAD re-assembles and decodes the TDMUs into original data format, and runs the corresponding applications.

FIG. 1 Operation

End user applications are running on the PMADs 30A, 30B, 105. The applications include user interaction, communication management and application control. Each PMAD's communication management and application control setting information are also stored in the TDMN Domain 10. The TDMN Domain 10 and APs 20A, 20B manage the TDMU to be transmitted and received among the PMADs 30A, 30B. The TDMN Domain 10 and Aps 20A, 20B also guarantee the security and QOS of the links for the end users. The PMADs communication management and application control include the contact list, QOS setting, data security setting and etc. There are always two virtual links can be established to allow the PMADs to communicate to each other. These two virtual links are: virtual control and security data link 112 and virtual communication data link 113. While the PMADs are roaming, the actual link inside the TDMN system may vary; the two virtual links can always be established. Once the virtual link is created, the two or a group of the PMADs remain virtually connected. The virtual link will be torn down when the particular PMAD is not presence to the TDMN system, and it needs to re-establish the virtual link before it can communicate with other PMADs. As shown in the current embodiment, the PMADs 30A and 30B are connected together via two virtual links 112 and 113. Both PMADs 30A and 30B are present to the TDMN system. The PMAD 30A connects to the TDMN system via the wireless link 111A to the AP 20A, which reports the presence of the PMAD 30A to the TDMN Domain 10. The PMAD 30B connects to the TDMN system via the wireless link 111B to the AP 20B, which reports the presence of the PMAD 30B to the TDMN Domain 10. Both one of the PMADs 30A or 30B can start to call the other one, and the operation causes the TDMN system to establish a virtual control and security data link 112, and a virtual communication data link 113 between the PMAD 30A and 30B. If one of PMADs 30A and 30B is not presence to the system, then, there is not virtual link can be established from end to end. The waiting message can be stored in the TDMN system or the PMAD itself by the control of the default setting of the properties of each PMAD, until the virtual links are established again.

FIG. 4 Operation

Figure 4:
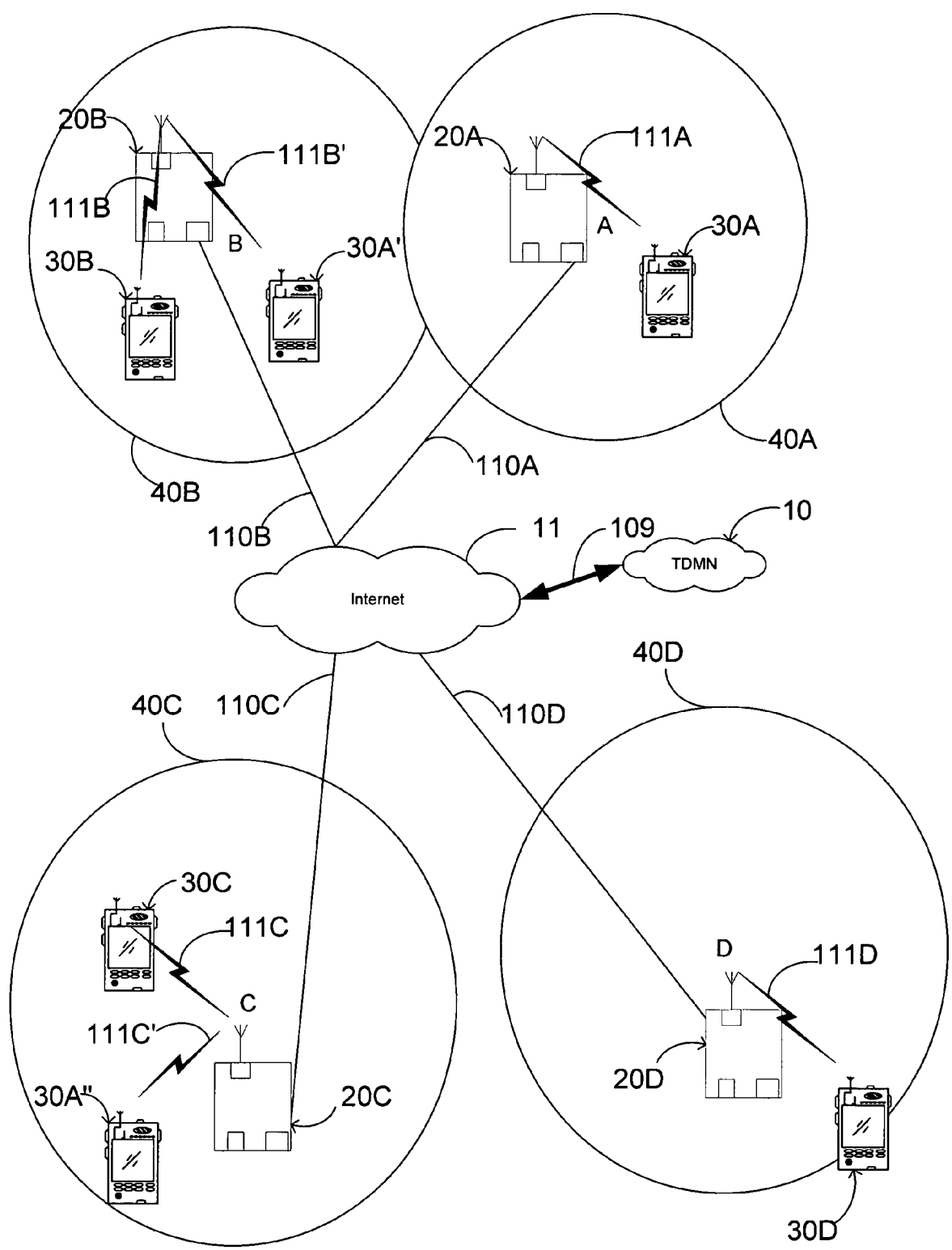
FIG. 4 is a schematic representation of multiple Personal Mobile Access Devices (PMADs) communicating with each other of the present invention.

FIG. 4 is a schematic representation of multiple Personal Mobile Access Devices (PMADs) communicating with each other of the present invention. In this embodiment, there are four APs (20A, 20B, 20C, 20D) connecting to TDMN Domain 10 via internet connections (110A, 110B, 110C, 110D). These APs (20A, 20B, 20C, 20D) are at different locations with different wireless coverage cells (40A, 40B, 40C, 40D). Among which, AP 20A and 20B are at wireless adjacent area. As shown, the PMAD 30A is performing a roaming from location 40A to 40B and 40C, while talking to PMAD 30D at location 40D. Because 40A and 40B are adjacent of two cells, the AP 20B automatically takes over the connection when the PMAD 30A enters its wireless cell. The roaming of the PMAD 30A (30A') from 40A to 40B keeps the virtual links that connect to the PMAD 30D; in another word, the communication remains active while the roaming of the PMAD 30A from 40A to 40B. When the PMAD 30A' (30A") roams from 40B to 40C, because 40B and 40C are not adjacent of two cells, the PMAD 30A' will lost the connection to the TDMN system for a certain time and then the rejoin the TDMN system via its connection 111C' to AP 20C. Under this circumstance, the PMAD 30A" needs to be re-established the virtual links to the PMAD 30D to continue the communication.

Also as shown in the embodiment, the PMAD device 30B, 30C, 30D are performing group communication. The group virtual links need be established by the TDMN system.

Thus, in accordance with this invention, it is now possible to utilize the internet as cost effective global wide area network backbone to form the TDMN system. Via wireless connections to the APs 20 of the TDMN network, the PMAD 30 may establish the virtual links, thus to perform one to one or one to group two-way data communications.

CONCLUSION, RAMIFICATIONS, AND SCOPE

It can be seen that, according to the invention, I have provided an Internet Based Time Distributed Message Network (TDMN) system and Personal Mobile Access Device (PMAD). All the PMADs can have high quality communication to each other via Internet and TDMN. The TDMN and TDMU mechanism ensure no information loss, which is unachievable by the conventional cellular technology. The present revolutionary invention provides high quality voice, video, data global roaming communication at ultra low cost.

Furthermore, the TDMN system and the PMAD device have additional advantages in that:
- to overcome the unmanageable two-way continuously communication quality of service (QOS) of Internet communication and TCP/IP technology. In the prior art, it is very hard to maintain QOS of Internet, because of the variety of the bandwidth and the unpredictable of the Internet traffic.
- to eliminate the unpredictable time delay and/or the TCP/IP package damage, thus no message will be distorted by the time factor, which is caused by Internet communication.
- Have ultra low cost and very high growing network coverage alone the growth of the Internet.
- Majority of the wireless communication between AP and PMAD is using wireless LAN technology. This provides high efficient of RF usage, low RF pollution to environment, and less RF hazard to human compared to cellular phone technology.

Although the description above contains much specificity, these should not be construed as limiting the scope of the invention but as merely providing illustrations of some of the presently preferred embodiments of this invention. Various other embodiments and ramifications are possible within it's scope. For example:

- A non-wireless device can run the same feature to join in the TDMN and simulate the PMAD function, and communicate with the other PMAD.
- A small scale TDMN may be running in some certain location to provide the service to its own PMADs. In this scenario, simpler TDMN can also achieve the goal.
- A PMAD may be used as Internet access gateway for the computer.
- A PMAD may be as simple as just providing two-way voice communication, without complicated full feature. So, the PMAD design may be different.
- TDMUs may be exchanged on top of non-TCP/IP networking protocol.
- TDMUs may be used to carry encrypted messages, to provide high-secured communication among PMADs.
- A group of PMADs may communicate with other group of PMADs instead of one to one.

Thus the scope of the invention should be determined by the appended claims and their legal equivalents, rather than by the examples given.

What is claimed is:

1. An Internet based wireless communication system (IBWCS), comprising:
    one server means running on Internet,
    a plurality of wireless Access Points (APs) with Internet connection and providing wireless networking access,
    a plurality of Personal Mobile Access Device (PMAD) with wireless networking capability for getting wireless Internet access via said AP,
    Wherein the APs has dedicated port for Internet connection,
    Whereby the APs communicating with the server means via Internet,
    Wherein said PMAD is personal mobile communication device with user and media interfaces, and wireless networking means to communicate with said APs,
    Whereby the PMAD access Internet wirelessly through the AP and communicate with the server means via Internet,
    Whereby the PMADs access Internet wirelessly through the APs and join the server means for communication among each other of the PMADs,
    Whereby the server means verifies ID and usage configuration of the PMADs and controls the PMAD to PMAD communication over Internet,
    Wherein said IBWCS forming virtual communication paths among said PMADs and said server means over the Internet,
    Whereby messages are communicated among said PMADs and server means via said virtual communication paths,
    Whereby being a key element in said virtual communication paths said server means guarantees the PMAD to PMAD communication over Internet without message loss by storing and resending communication message to ensure message delivery, and
    Whereby the PMADs communicating with each other via the server means and Internet.

2. The system of claim 1 wherein one of said PMAD can roam among the wireless access of said APs around Internet and communicate with said server means and other PMADs.

3. An Internet based wireless communication system, comprising:
    a Internet based message communication network (TDMN) including server means connecting to Internet and TDMN operation function means;
    a plurality of wireless Access Points (APs) with Internet connection and providing wireless networking access;
    a plurality of Personal Mobile Access Device (PMAD) with wireless networking capability for getting wireless Internet access via said AP,
    Wherein the APs has dedicated port for Internet connection,
    Whereby the APs communicating with the TDMN via Internet,
    Wherein said PMAD is personal mobile communication device with user and media interfaces, and wireless networking means to communicate with said APs,
    Wherein said PMAD has multimedia and data communication function means corresponding with said TDMN operation function means,
    Whereby the PMAD access Internet wirelessly through the AP and join the TDMN for communication among each other of the PMADs over Internet,
    Whereby the TDMN and the APs providing communication among the PMADs over Internet, and
    Wherein said TDMN forming virtual communication paths among said PMADs over the Internet,
    Whereby messages are communicated among said PMADs and TDMN via said virtual communication paths,
    Whereby being a key element in said virtual communication paths said server means of the said TDMN guarantees the PMAD to PMAD communication over Internet without message loss by storing and resending communication message to ensure message delivery, and
    Whereby the TDMN enables verifies ID and usage configuration of PMAD, controls, and guarantees the PMAD to PMAD communication over Internet without message lost.

4. The system of claim 3 wherein said PMAD is performing time distributed two-way message communication by sending a complete source of voice, video and/or other file or message into a group of message units over Internet to the TDMN, and, said TDMN guarantees said a group of message units to be completely received at receiving PMAD:
    whereby said TDMN stores the undelivered message units when there is interruption of Internet connection of receiving PMAD, and
    whereby said TDMN continues delivering said undelivered message when the interrupted communication of said receiving PMAD to said TDMN recovers.

5. The system of claim 3 wherein said TDMN manages the communication of said PMADs with different quality of service level.

6. An Internet based wireless communication system comprising:
    a Internet based message communication network (TDMN) including server means connecting to Internet and TDMN operation function means;
    a plurality of wireless Access Points (APs) with Internet connection and providing wireless networking access;
    a plurality of Personal Mobile Access Device (PMAD) with wireless networking capability for getting wireless Internet access via said AP,
    Wherein the APs has dedicated port for Internet connection, Whereby the APs communicating with the TDMN via Internet, Wherein said PMAD is personal mobile communication device with user and media interfaces, and wireless networking means to communicate with said APs, Wherein said PMAD has multimedia and data communication function means corresponding with said TDMN operation function means, Wherein said APs enables the PMADs to join the TDMN for communication over Internet connection;

Whereby the PMAD access Internet wirelessly through the AP and join the TDMN for communication among each other of the PMADs over Internet, Whereby the TDMN and the APs providing communication among the PMADs over Internet, and Wherein said TDMN forming virtual communication paths among said PMADs over the Internet, Whereby messages are communicated among said PMADs and TDMN via said virtual communication paths, Whereby being a key element in said virtual communication paths said server means of the said TDMN guarantees the PMAD to PMAD communication over Internet without message loss by storing and resending communication message to ensure message delivery, and Whereby the TDMN verifies ID and usage configuration of PMAD, controls, and guarantees the PMAD to PMAD communication over Internet without message lost, wherein said TDMN has server means forming three-level hierarchical domain system for managing communication, comprising:

a host domain, a control domain and an access domain, wherein access domain is the bottom level of said hierarchical domain system, said access domain comprising a plurality of Access Server means and one Control Server means managing said Access Server means, wherein control domain is the second level of said hierarchical domain system, said control domain comprising a plurality of said Control Server means and one Node Server means managing said Control Server means, and wherein host domain is the core of said TDMN, comprising a plurality of said Node Server means and one Host Server means managing said Node Server means.

7. The system of claim 3, wherein said a plurality of PMADs can perform group communication.

8. The system of claim 3 wherein one of said PMAD can roam among the wireless access of said APs around Internet and communicate with said server means and other PMADs.

9. An Internet based wireless communication system, comprising:

a Internet based message communication network (TDMN) including server means connecting to Internet and TDMN operation function means;

a plurality of wireless Access Points (APs) with Internet connection and providing wireless networking access, a plurality of Personal Mobile Access Device (PMAD) with wireless networking capability for getting wireless Internet access via said AP, a time distributed message process function means for package source data into multiple time distributed message units (TDMU) to communicate over Internet Wherein the APs has dedicated port for Internet connection, Whereby the APs communicating with the TDMN via Internet, Wherein said PMAD is personal mobile communication device with user and media interfaces, and wireless networking means to communicate with said APs, Wherein said PMAD has multimedia and data communication function means corresponding with said TDMN operation function means, wherein said TDMU is communication message unit of any original source information for communication among PMADs and said TDMN via Internet, Whereby the PMAD accesses Internet wirelessly through the AP and join the TDMN for communication among each other of the PMADs over Internet, Whereby the TDMN and the APs providing communication among the PMADs over Internet connection Whereby the TDMN verifies ID and usage configuration of the PMADs and controls the PMAD to PMAD communication over Internet, Wherein said TDMN forming virtual communication paths among said PMADs over the Internet, Whereby messages are communicated among said PMADs and TDMN via said virtual communication paths, Whereby being a key element in said virtual communication paths said server means of the said TDMN guarantees the PMAD to PMAD communication over Internet without message loss by storing and resending communication message to ensure message delivery, and Whereby PMAD doing message communication via Internet and TDMN with TDMU means.

10. The system of claim 9 wherein said PMAD comprising:

means to convert data resource to be transferred in to TDMU, means to convert the received TDMU into original data format, and means to control the communication with TDMN and other PMAD of claim 9.

11. The system of claim 9 wherein said TDMU is a base communication message unit of a communication protocol means constructed on top of TCP/IP protocol and Internet to overcome information communication loss and/or low quality due to unstable Internet connection:

wherein a original message is packaged into a group of TDMUs be sent over Internet, wherein a complete original message is able to be recovered as long as its complete belonging group of TDMUs is complete received, and wherein TDMU set (a group of TDMUs) communication can be interrupted and resumed.

12. The system of claim 9 whereby said PMADs package source data of voice, video, other file and message into a group of TDMUs send across Internet via the TDMN for delivering to receiving PMAD, and, said TDMN guarantees said a group of TDMUs to be completely received at receiving PMAD:

whereby said TDMN stores the undelivered TDMUs when there is interruption of Internet connection of receiving PAMD, and whereby said TDMN continues to deliver said undelivered TDMUs when the interrupted communication of said receiving PMAD to said TDMN recovers, whereby the transmitting and receiving of said message units is controlled by the operation means of TDMN with time-distributed feature of store and change the speed of communication to overcome the Internet connection unstable and interruption during the communication of sending and receiving PMADs.

13. The system of claim 9 wherein said TDMN manages the communication of said PMADs with different quality of service level.

14. The system of claim 9 wherein said TDMN has server means forming three level hierarchical domain system for managing communication, comprising:
  a host domain, a control domain and a access domain,
  wherein access domain is the bottom level of said hierarchical domain system, said access domain comprising a plurality of Access Server means and one Control Server means managing said Access Server means,
  wherein control domain is the second level of said hierarchical domain system, said control domain comprising a plurality of said Control Server means and one Node Server means managing said Control Server means, and
  wherein host domain is the core of said TDMN comprising a plurality of said Node Server means and one Host Server means managing said Node Server means.

15. The system of claim 9, wherein a plurality of said PMADs can perform group communication.

16. The system of claim 9 wherein one of said PMAD can roam among the wireless access of said APs around Internet and communicate with said server means and other PMADs.

17. Method of time distributed two-way mobile message communication over Internet according to claim 3 comprising:
  operating TDMN of claim 3, wherein said TDMN operation means controlling and ensuring message exchange among said PMADs of claim 3,
  connecting said APs of claim 3 to Internet and providing wireless Internet access for said PMADs,
  having first of said a plurality of PMADs networking wirelessly to one of a plurality APs of claim 3 to establish Internet connection and then join said TDMN via Internet,
  having second of said a plurality of PMADs networking wirelessly to one of said a plurality of APs to establish Internet connection and then join said TDMN via Internet,
  establishing communication between said first and second PMAD via said TDMN,
  communicating messages between said first and second PMAD via Internet and said TDMN,
  communicating messages among said a plurality of PMADs of claim 3 via Internet and said TDMN,
  storing undelivered message in the TDMN when receiving PMAD having Internet connection interruptions, and
  continually delivering stored message to receiving PMAD when said receiving PMAD recovers Internet connection.

18. The method of claim 17, whereby TDMN establishing two virtual links (virtual control and security data link, virtual communication data link) to connect the sending and receiving among PMADs and said TDMN over Internet.

19. The method of claim 17 wherein a plurality of said PMADs joining said operating TDMN via Internet performing group communication among each other.

20. The method of claim 17 wherein said PMADs roaming among said a plurality of APs with wireless connection around the Internet for joining said operating TDMN for communication among each other of said PMADs.

21. A method of internet based time-distributed two way communication according to claim 9, comprising:
  operating TDMN of claim 9, wherein said TDMN operation means control and ensure the message communication among PMADs control the access of a plurality of PMADs of claim 9,
  connecting said APs of claim 9 to Internet and providing wireless Internet access,
  having said a plurality of PMADs establishing wireless Internet connection to a plurality APs of claim 9 and joining said TDMN via Internet,
  packaging an original voice, video, other file or message into a group of TDMUs in sending PMAD,
  transmitting said a group of TDMUs to receiving PMAD via Internet and TDMN,
  storing undelivered message in the TDMN and ensuring complete message received by receiving PMAD to overcome Internet speed unstable and interruptions, and
  unpacking said a group of TDMUs to original format at receiving PMAD.

22. One Internet and wireless network based message communication system, comprising:
  One wireless mobile access network based on wireless LAN technology;
  One message communication server means (CS);
  A plurality personal mobile access device (PMAD);
  Wherein the wireless mobile access network is a plurality of wireless access points (AP) connecting to Internet,
  Wherein the CS is a server operation means operating with Internet connections,
  Whereby AP communication to said CS via Internet,
  Whereby PMAD doing wireless mobile communication by wireless communication to AP,
  Whereby PMADs communicate among other via said AP and Internet,
  Whereby PMAD communicate with said CS via Internet,
  Whereby said message communication system encodes and packet original multimedia and/or data message in to multiple message units for transmission and receiving over the Internet,
  Whereby said message communication system sends and receives said message units among said PMADs and said message communication server system,
  Wherein said message communication system forming virtual communication paths among said PMADs and said server means over the Internet,
  Whereby messages are communicating among said PMADs and server means via said virtual communication paths,
  Whereby being part of said virtual communication paths said CS guarantees the PMAD-to-PMAD communication over Internet without message loss by storing and resending communication messages to ensure message delivery, and
  Whereby the CS verifies ID and usage configuration of the PMADs, controls and guarantees the message communication among said PMADs.

* * * * *